A. W. FRENCH.
GATE OPERATING MECHANISM FOR MEAL COOKERS AND THE LIKE.
APPLICATION FILED AUG. 4, 1913.

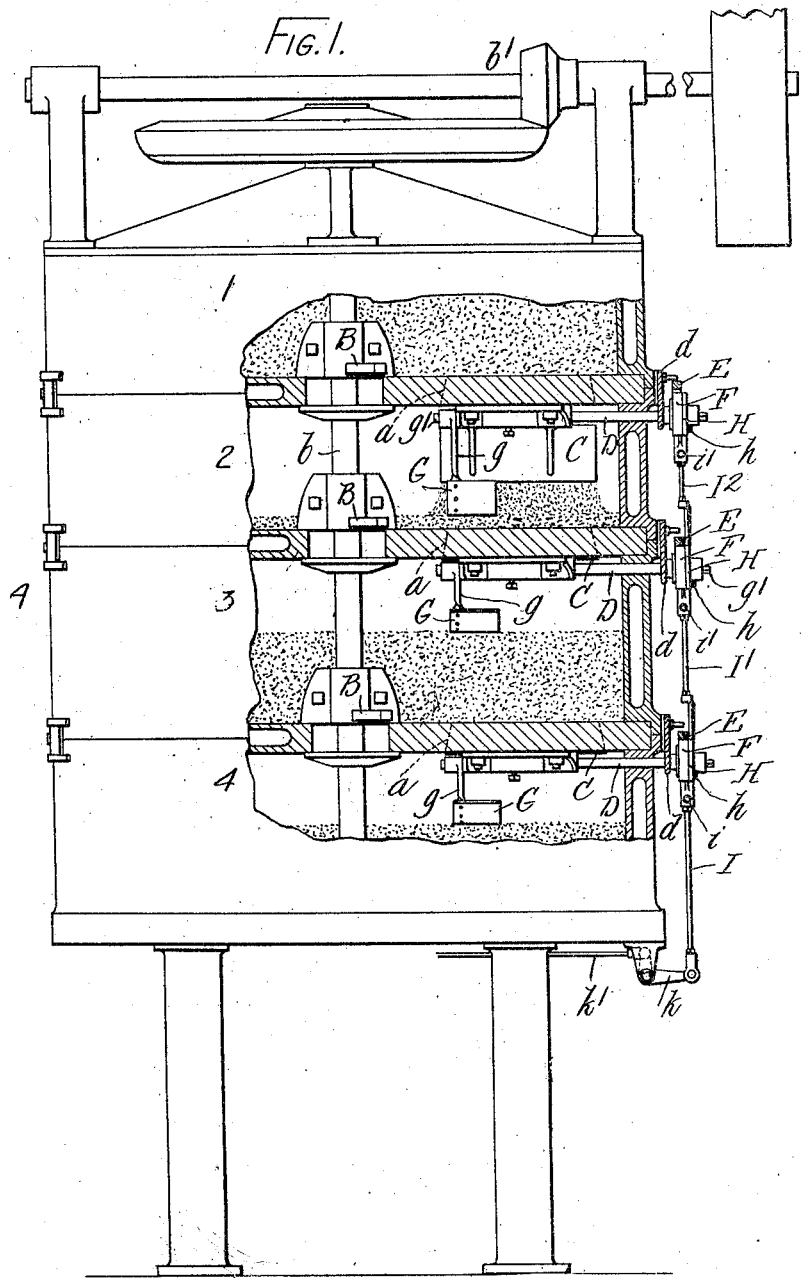

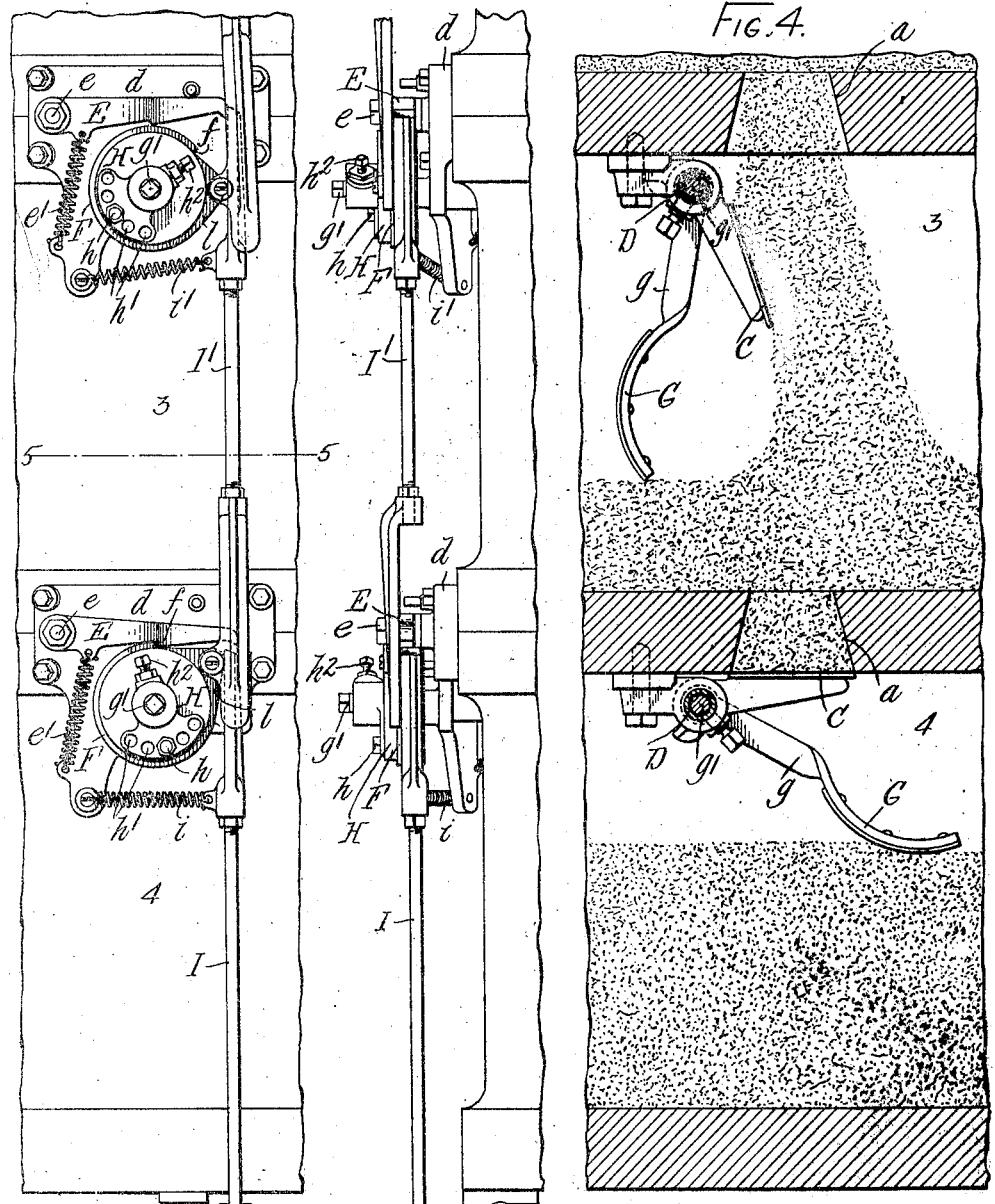

1,091,055.

Patented Mar. 24, 1914.
3 SHEETS—SHEET 3.

Witnesses.

Inventor.
Alfred W. French
Wilhelm Parkin Haid
Attorneys

UNITED STATES PATENT OFFICE.

ALFRED W. FRENCH, OF PIQUA, OHIO.

GATE-OPERATING MECHANISM FOR MEAL-COOKERS AND THE LIKE.

1,091,055.   Specification of Letters Patent.   Patented Mar. 24, 1914.

Application filed August 4, 1913. Serial No. 782,800.

*To all whom it may concern:*

Be it known that I, ALFRED W. FRENCH, a citizen of the United States, residing at Piqua, in the county of Miami and State of Ohio, have invented a new and useful Improvement in Gate-Operating Mechanisms for Meal-Cookers and the like, of which the following is a specification.

This invention relates to apparatus, such as steam cookers for oil-bearing meal, and the like, which comprise a plurality of kettles or chambers arranged to permit the discharge of material from one chamber to the next and provided with gates for controlling the delivery of the material from chamber to chamber so as to regulate the quantity of material in the chambers and the length of time that it remains therein.

In application Serial No. 758,340, filed April 2, 1913, by M. W. Faherty, assignor to myself, is disclosed a meal cooker of this nature, in which the gates are operated to discharge the kettles in succession, the gate of one kettle being controlled by the level of the material in the next kettle below.

According to the present invention the gate of the kettle next to the bottom is preferably adapted to be operated at will to deliver the material from this kettle to the bottom kettle when the latter is empty or when the line of presses has been filled, and the gates of the other kettles are automatically controlled so that each kettle is discharged after the kettle next below has been emptied and the gate thereof closed.

One object of the invention is to provide an efficient, practical and reliable gate-operating mechanism for apparatus of this nature, by which the gates can be caused to operate so as to properly control the delivery of the material from kettle to kettle and the time that it remains in the cooker as may be required by reason of variations in the quality or condition of the material and changing conditions in the mill, or as may be deemed advisable by the experienced operative.

Another object of the invention is to provide an improved gate operating mechanism for apparatus of this sort of the construction hereinafter described and set forth in the claims.

Figure 5:
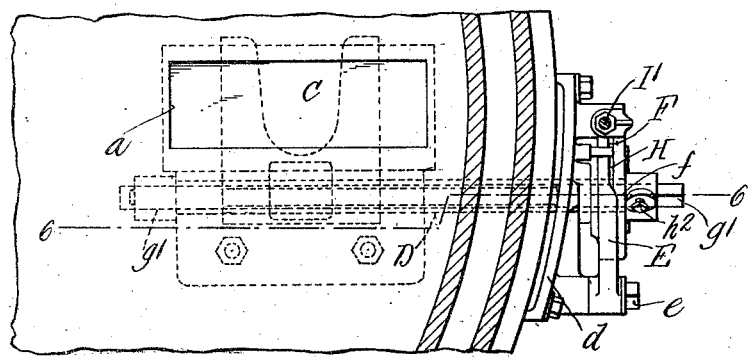
Figure 6:
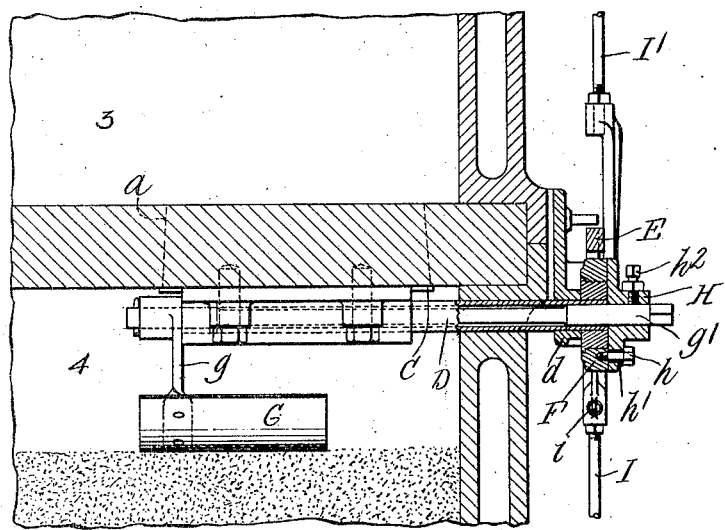
Figure 7:
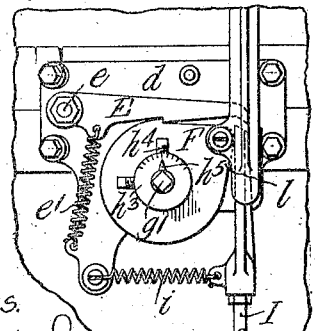
Figure 8:
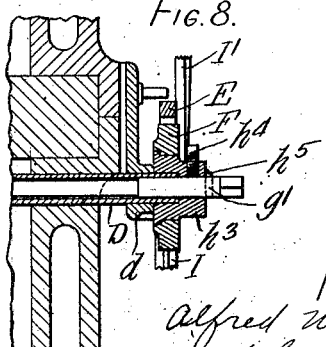

In the accompanying drawings: Figure 1 is a fragmentary elevation, partly in section, of a meal cooker embodying the invention. Fig. 2 is a fragmentary side elevation, on an enlarged scale, thereof. Fig. 3 is a fragmentary rear elevation thereof. Fig. 4 is a fragmentary sectional elevation thereof showing one of the gates open and another closed. Fig. 5 is a fragmentary plan view thereof partly in section, in line 5—5, Fig. 2. Fig. 6 is a sectional elevation thereof in line 6—6, Fig. 5. Figs. 7 and 8 are respectively a fragmentary side elevation and sectional elevation of a gate operating mechanism of slightly modified construction.

Like reference characters refer to like parts in the several figures.

A, Fig. 1, represents an oil-meal cooker of known construction, comprising a series of four heating kettles or chambers 1, 2, 3, 4, arranged in a descending series and provided with bottom discharge openings $a$ so that the material can discharge by gravity from one kettle into the next lower kettle. The cooker is provided with the usual stirrers or scrapers consisting of arms B projecting laterally in the lower portions of the kettles from a vertical central shaft $b$ which is driven by any suitable mechanism $b'$. Any other suitable arrangement and number of kettles can be employed.

Each kettle except the bottom one is provided with a gate C controlling the discharge opening $a$ thereof and adapted to swing open downwardly into the next kettle below. The material is drawn from the bottom kettle intermittently in measured quantities as usual, for forming the cakes for the presses. As shown in the drawings, the gate is secured to a hollow hinge shaft or tube D which is arranged to turn in suitable bearings and extends out of the cooker through a hole in the side wall thereof, being provided outside of the cooker with a part adapted to be engaged by a latch or dog E for holding the gate shut.

$d$ represents a bearing plate on the exterior of the cooker for the outer end of the hinge tube. The latch shown is pivoted at $e$ to the bearing plate $d$ and is held by a spring $e'$ against the edge of a disk F which is fixed on the outer end of the hinge tube D. The latch does not interfere with the closing of the gate but when the gate is closed the latch engages a tooth or shoulder $f$ on the disk, thereby locking the gate. A latch or locking device of any other suitable construction adapted to allow the gate to close and to hold it closed until the latch is released, as hereinafter explained, could be employed.

G represents a gate closing device or float which is adapted to ride or float on the material in the kettle into which the gate depends. The float is lifted by the material accumulating in the kettle and closes the gate when the material reaches a predetermined level. In order to enable the gate to be closed when the material reaches one or another level so as to regulate the quantity of material in the kettle as desired, the float is connected to the gate in such a way that it can be adjusted to different angular relations to the gate. For this purpose the arm $g$ of the float G is fixed to the inner end of a shaft $g'$ that extends lengthwise through the hinge tube D and is adapted to be rotatably adjusted therein and secured by any suitable means which are accessible at the outside of the cooker. As shown in Figs. 1 to 6, the float shaft $g'$ is adjustably secured to the hinge tube by a pin or screw $h$ which is adapted to be inserted into a hole in the latch disk F through any one of a series of holes $h'$ in a disk H which is secured by a set screw $h^2$, or otherwise, to the outer end of the shaft $g'$, thus enabling the shaft $g'$ and the attached float to be adjusted to different angular relations to the gate.

Figs. 7 and 8 show a different and simpler adjustable connection for the purpose, in which the latch disk F is provided with a hub extension $h^3$ through which the shaft $g'$ passes, and to which it can be adjustably secured by a set screw $h^4$ in the hub extension. The end of the shaft is provided with a pointer $h^5$ coöperating with graduations on the disk hub to indicate the adjustment.
Any other suitable means enabling the ready adjustment of the float relative to the gate could be employed in place of those described.

I I' I² represent rods for tripping the latches E to release the gates for discharging the material from one kettle into the next.

The rod I, which trips the latch of the gate C that controls the delivery of the material from kettle No. 3 into the bottom kettle, is adapted to be actuated manually by the former man. This rod stands with its upper end normally held beneath the free end of the latch E and against the edge of the latch disk F by a spring $i$. The lower end of the rod is preferably connected by a lever $k$ and a rod $k'$ to the slide (not shown) that closes the discharge opening of the bottom kettle so that the rod will be lifted to trip the latch E and release the gate C to deliver the material into the bottom kettle when the slide of the latter is closed after withdrawing the desired amount of material from the cooker. When the gate swings open, an eccentric portion $l$ of the latch disk F, which turns with the gate, strikes the trip rod and shoves its upper end from beneath the end of the latch so that the latch can engage and lock the gate when it is again closed. When the gate is closed the upper end of the trip rod is restored to its normal position beneath the end of the latch by its spring $i$.

The other trip rods I' I² are respectively connected to and actuated by the gates of the kettles 3 and 2 in such a way that when the gate of kettle No. 3 is closed the rod I' trips the latch and releases the gate of kettle No. 2 next above, and when this gate is closed the rod I² releases the gate of kettle No. 1. In this way one kettle is discharged and its gate closed before the material is delivered thereto from the next kettle above. Each rod I' I² is therefore preferably pivoted at its lower end to the latch disk F of one gate with its upper end arranged to actuate the latch for the next gate above as before explained in connection with the trip rod I. A spring $i'$ normally holds the upper end of each of the rods I' I² beneath the free end of the latch, and the trip rod is shoved from beneath the latch when the gate swings open by an eccentric portion of the latch disk as before described.

The operation of the cooker, assuming the kettles to contain the desired maximum amount of material and the several gates to be shut and locked by their latches, is as follows: The material is drawn from the bottom kettle 4 intermittently in measured quantities for forming the cakes and when all of the presses have been filled or the bottom kettle emptied, or when, in the judgment of the operative, the material has remained in the cooker for the proper length of time, the trip rod I is actuated to release the gate of kettle No. 3. This gate will then open and deliver the material from the third kettle to the bottom kettle. The material accumulating in the bottom kettle will lift the float G and close the gate, which will be locked by its latch E, as before explained. The second trip rod I' will be lifted by the closing of the gate of kettle No. 3 and, when the gate reaches or approximately reaches the closed position, will trip the latch of the gate of the second kettle to allow the material to be delivered therefrom to the third kettle. In the same way the material will be delivered from the first kettle to the second when the gate of the second kettle is closed.

The level to which the material can rise in the kettles is determined by the adjustment of floats G relative to the gates and the floats can be readily adjusted, as before explained, to regulate as required the quantity of material in each kettle.

I claim as my invention:

1. The combination with a plurality of chambers arranged to permit material to discharge from one chamber into another, and a gate which controls the discharge of the material from one chamber into the next, of an actuating device for said gate which is governed by the quantity of the material in the receiving chamber for closing said gate, and means accessible at the exterior of said chambers for changing the relative position of said gate and actuating device for regulating the quantity of material delivered to the receiving chamber.

2. The combination with a plurality of chambers arranged to permit material to discharge from one chamber into another, and a gate which controls the discharge of the material from one chamber into the next, of an actuating device for said gate which is connected to the gate to move therewith and is governed by the quantity of the material in the receiving chamber for closing said gate, and means accessible at the exterior of said chambers for changing the relative position of said gate and actuating device for regulating the quantity of material delivered to the receiving chamber.

3. The combination with a plurality of chambers arranged to permit material to discharge from one chamber into another, and a gate which controls the discharge of the material from one chamber into the next, of a device which is governed by the level of the material in the receiving chamber for closing said gate, said gate and closing device having a common pivotal connection, and means for changing the angular relation of said gate and device to vary the controlling action of said gate.

4. The combination with a plurality of chambers arranged to permit material to discharge from one chamber into another, and a gate which controls the discharge of the material from one chamber into the next, of a device which is governed by the level of the material in the receiving chamber for closing said gate, said gate and closing device having a common pivotal connection, and means located exteriorly of said chambers for changing the angular relation of said gate and device to vary the controlling action of said gate.

5. The combination with a plurality of chambers arranged to permit material to discharge from one chamber into another, and a gate which controls the discharge of the material from one chamber into the next, of a float which is connected to said gate to move therewith and is adapted to ride on the material in the receiving chamber for closing said gate, and means exterior to said chambers for adjustably securing said float to said gate.

6. The combination with a plurality of chambers arranged to permit material to discharge from one chamber into another, and gates which control the discharge of the material from said chambers, means for releasing the gate of one chamber, means for closing said gate, and means controlled by the closing of said gate for releasing the gate of another chamber.

7. The combination with a plurality of chambers arranged to permit material to discharge from one chamber into another, and gates which control the discharge of the material from said chambers, means for releasing the gate of one chamber, means for closing said gate, and means controlled by the closing of said gate for releasing said other gates in succession.

8. The combination with a plurality of chambers arranged to permit material to discharge from one chamber into another, and gates which control the discharge of the material from said chambers, means for releasing the gate of one chamber, means controlled by the material discharged by said gate for closing said gate, and means controlled by the closing of said gate for releasing the gate of another chamber.

9. The combination with a plurality of chambers arranged to permit material to discharge from one chamber into another, and gates which control the discharge of the material from said chambers, means for releasing the gate of one chamber, means controlled by the level of the material in the next lower chamber for closing said gate, and means controlled by the closing of said gate for releasing the gate of another chamber.

10. The combination with a plurality of chambers arranged to permit material to discharge from one chamber into another, and gates which control the discharge of the material from said chambers, latches for holding said gates shut, means for actuating the latch to release the gate of one chamber, means for closing said gate, and means controlled by the closing of said gate for actuating the latch to release the gate of another chamber.

11. The combination with a plurality of chambers arranged to permit material to discharge from one chamber into another, and gates which control the discharge of the material from said chambers, means for releasing the gate of one chamber, means for closing said gates, latches for said other gates, and means controlled by the closing of each of said gates for actuating the latch to release the next gate.

12. The combination with a plurality of chambers arranged to permit material to discharge from one into another, and a plurality of gates each controlling the discharge of the material from one chamber into the next, of locking means for each of said gates, manually controlled means for releasing the locking means of one of said gates, means controlled by the material fed past said gate for closing the same, and means controlled by the closing of said gate for releasing the locking means of another gate.

13. The combination with a plurality of chambers arranged to permit material to discharge from one into another, and a plurality of gates each controlling the discharge of the material from one chamber into the next, of locking means and a gate actuating means for each of said gates, and a releasing device for the locking means of one of the gates actuated by the actuating means of another of the gates.

14. The combination with a plurality of chambers arranged to permit material to discharge from one into another, of a plurality of gates each controlling the discharge of the material from one chamber into the next, means for each gate for locking the same in closed position, means for releasing one of said locking means to permit the gate to open, means for closing said gate, and means actuated by said gate closing means for releasing another of said locking means.

15. The combination with a plurality of chambers arranged to permit material to discharge from one into another, of a gate controlling the discharge of the material from one chamber into the next, means for locking said gate in closed position, said means including a member movable with the gate, and a trip for releasing said locking means, said member acting on said trip to move the same into inoperative position.

16. The combination with a plurality of chambers arranged to permit the material to discharge from one chamber into another, and gates which control the discharge of the material from one chamber into the next, of means for opening said gates in succession, and means controlled by the material in each chamber for closing the gate of the chamber discharging thereinto, said closing means being adjustable to vary the action thereof.

17. The combination with a plurality of chambers arranged to permit the material to discharge from one chamber into another, and gates which control the discharge of the material from one chamber into the next, of means for opening said gates in succession, and means controlled by the material in each chamber for closing the gate of the chamber discharging thereinto, said closing means being independently adjustable to regulate independently the closing of the several gates.

18. The combination with a plurality of chambers arranged to permit the material to discharge from one chamber into another, and gates which control the discharge of the material from one chamber into the next, of means for opening and closing said gates in succession, said means being adjustable to regulate independently the closing of the several gates.

Witness my hand, this 25th day of July, 1913.

ALFRED W. FRENCH.

Witnesses:
IRENE ELI.
GRACE A. FRENCH.